United States Patent
Araki

(10) Patent No.: US 9,195,976 B2
(45) Date of Patent: *Nov. 24, 2015

(54) DEVICE, CHARGING METHOD, AND SYSTEM

(71) Applicant: RICOH COMPANY, LTD., Tokyo (JP)

(72) Inventor: Ryoji Araki, Fukuoka (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/616,816

(22) Filed: Feb. 9, 2015

(65) Prior Publication Data

US 2015/0154573 A1    Jun. 4, 2015

Related U.S. Application Data

(63) Continuation of application No. 13/368,674, filed on Feb. 8, 2012, now Pat. No. 8,982,386.

(30) Foreign Application Priority Data

Feb. 23, 2011  (JP) ................... 2011-036882

(51) Int. Cl.
*G06Q 20/10* (2012.01)
*G06Q 20/08* (2012.01)
(Continued)

(52) U.S. Cl.
CPC ........ *G06Q 20/085* (2013.01); *G06F 17/30902* (2013.01); *G06Q 10/10* (2013.01)

(58) Field of Classification Search
CPC . G06Q 20/085; G06Q 10/10; G06F 17/30902

USPC .................................. 358/1.1–3.29
See application file for complete search history.

(56) References Cited

U.S. PATENT DOCUMENTS

| 7,957,021 B2 | 6/2011 | Moroi |
| 2001/0004417 A1* | 6/2001 | Narutoshi et al. .............. 386/52 |
| 2002/0054324 A1 | 5/2002 | Okada et al. |

(Continued)

FOREIGN PATENT DOCUMENTS

| CN | 1483178 | 3/2004 |
| CN | 101969520 | 2/2011 |

(Continued)

OTHER PUBLICATIONS

Chinese Office Action dated May 5, 2014.
(Continued)

*Primary Examiner* — Marcellus Augustin
(74) *Attorney, Agent, or Firm* — IPUSA, PLLC

(57) ABSTRACT

A device includes a display control unit configured to display a Web page on an operations panel, the Web page including a standard script and an extended script for controlling the device, an execution unit configured to cause the device to perform a process according to an instruction indicated by the extended script, and a storing unit configured to store information indicating whether respective instructions indicated by extended scripts require charges. The execution unit is configured to determine whether the instruction indicated by the extended script included in the Web page requires a charge by referring to the information stored in the storing unit, and to update charging information for the process performed according to the instruction indicated by the extended script when the instruction requires the charge.

9 Claims, 10 Drawing Sheets

| EXTENDED SCRIPT | JOB ATTRIBUTE | CHARGE REQUIREMENT |
|---|---|---|
| doDownload |  | NOT REQUIRED |
| doPrint | documentType=pdf | REQUIRED |
|  | documentType=bmp | NOT REQUIRED |
|  | page=1 | NOT REQUIRED |
|  | : | : |
| : | : | : |

(51) Int. Cl.
    *G06Q 10/10*     (2012.01)
    *G06F 17/30*     (2006.01)

(56)     References Cited

U.S. PATENT DOCUMENTS

| | | |
|---|---|---|
| 2002/0083092 A1 | 6/2002 | Simpson |
| 2003/0107762 A1 | 6/2003 | Kinoshita et al. |
| 2004/0088170 A1* | 5/2004 | Nakanishi et al. ................. 705/1 |
| 2006/0262349 A1* | 11/2006 | Moroi .......................... 358/1.15 |
| 2007/0189709 A1 | 8/2007 | Ageishi et al. |
| 2007/0260702 A1 | 11/2007 | Richardson et al. |
| 2010/0014117 A1* | 1/2010 | Iwamoto et al. ............. 358/1.15 |
| 2011/0019821 A1* | 1/2011 | Kino ............................. 380/255 |
| 2011/0029888 A1* | 2/2011 | Tsujimoto ..................... 715/743 |
| 2011/0041144 A1 | 2/2011 | Araki |
| 2011/0225600 A1 | 9/2011 | Araki |

FOREIGN PATENT DOCUMENTS

| | | |
|---|---|---|
| JP | 2002-108475 | 4/2002 |
| JP | 2003-167694 | 6/2003 |
| JP | 2006-352845 | 12/2006 |
| JP | 2008-228143 | 9/2008 |
| JP | 2010-026819 | 2/2010 |
| JP | 2011-041009 | 2/2011 |

OTHER PUBLICATIONS

Japanese Office Action dated Sep. 24, 2014.

* cited by examiner

FIG.10

| EXTENDED SCRIPT | JOB ATTRIBUTE | CHARGE REQUIREMENT |
|---|---|---|
| doDownload | documentType=pdf | NOT REQUIRED |
| doPrint | documentType=bmp | REQUIRED |
| | page=1 | NOT REQUIRED |
| .. | .. | NOT REQUIRED |
| .. | .. | .. |

168

DEVICE, CHARGING METHOD, AND SYSTEM

CROSS-REFERENCE TO RELATED APPLICATION

The present application is a continuation application of U.S. patent application Ser. No. 13/368,674, filed on Feb. 8, 2012 and is based upon and claims the benefit of priority of Japanese Patent Application No. 2011-036882, filed on Feb. 23, 2011, the entire contents of which are incorporated herein by reference.

BACKGROUND OF THE INVENTION

1. Field of the Invention

An aspect of this disclosure relates to a device, a charging method, and a system.

2. Description of the Related Art

There exists an image forming device including a browser function that obtains a Web page written in, for example, the Hypertext Markup Language (HTML) from another device via a network or from a storage unit of the image forming device, and displays the Web page on an operations panel of the image forming device. In addition to displaying a Web page, a browser function may also be capable of parsing (or interpreting) scripts extended for device control and thereby controlling the image forming device, for example, to perform printing. With such a browser function, it is possible to provide a browser-based API (application programming interface) such as a scripting language for customization of the image forming device (see, for example, Japanese Laid-Open Patent Publication No. 2006-352845).

Also, there is an image forming device including a charging (or billing) function. For example, the image forming device manages charging information based on which the user is charged and updates the charging information when printing or scanning is performed.

Here, charges for the use of functions of an image forming device resulting from execution of scripts on a Web page are preferably determined in a more flexible manner than in a case where functions of the image forming device are used via standard applications preinstalled in the image forming device.

SUMMARY OF THE INVENTION

In an aspect of this disclosure, there is provided a device that includes a display control unit configured to display a Web page on an operations panel, the Web page including a standard script and an extended script for controlling the device, an execution unit configured to cause the device to perform a process according to an instruction indicated by the extended script, and a storing unit configured to store information indicating whether respective instructions indicated by extended scripts require charges. The execution unit is configured to determine whether the instruction indicated by the extended script included in the Web page requires a charge by referring to the information stored in the storing unit, and to update charging information for the process performed according to the instruction indicated by the extended script when the instruction requires the charge.

BRIEF DESCRIPTION OF THE DRAWINGS

FIG. 10 is a table illustrating exemplary information stored in a charge requirement information storing unit.

DESCRIPTION OF THE PREFERRED EMBODIMENTS

Figure 1:
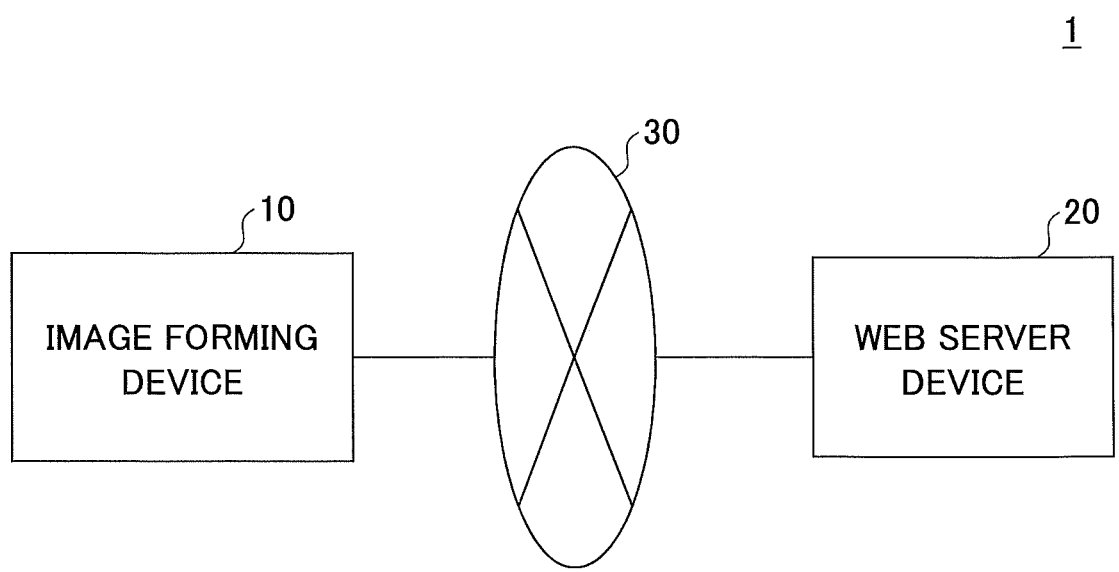
FIG. 1 is a drawing illustrating an exemplary configuration of a system according to an embodiment.

Preferred embodiments of the present invention are described below with reference to the accompanying drawings. FIG. 1 is a drawing illustrating an exemplary configuration of a system 1 according to an embodiment. As illustrated in FIG. 1, the system 1 may include an image forming device 10 and a Web server device 20 that are connected to each other for communications via a (wired or wireless) network 30 such as a local area network (LAN) or the Internet.

The image forming device 10 may be, for example, a multifunction peripheral including two or more functions such as printing, scanning, copying, and facsimile transmission and reception. Alternatively, the image forming device 10 may include one of the above functions. The image forming device 10 is an example of a device according to an aspect of this disclosure.

The Web server device 20 may be, for example, a computer that receives a request for a Web page from the image forming device 10 and sends the corresponding Web page to the image forming device 10 based on identification information (e.g., uniform resource locator (URL)) specified in the request. The Web page to be sent by the Web server device 20 may be retrieved from a storage unit of the Web server device 20 or an external storage unit, or may be dynamically generated by the Web server device 20 or another computer connected to the Web server device 20. In the present embodiment, a Web page may indicate display data to be obtained by the image forming device 10 via Hypertext Transfer Protocol (HTTP) communications from an internal storage unit of the image forming device 10 or from another device (e.g., the Web server device 20). A Web page may be written, for example, in the Hypertext Markup Language (HTML).

Although only one image forming device 10 and one Web server device 20 are illustrated in FIG. 1, the system 1 may include two or more image forming devices 10 and two or more Web server devices 20. Also, the relationship between the image forming device(s) 10 and the Web server device(s) 20 may be "one to many", "many to one", or "many to many".

Figure 2:
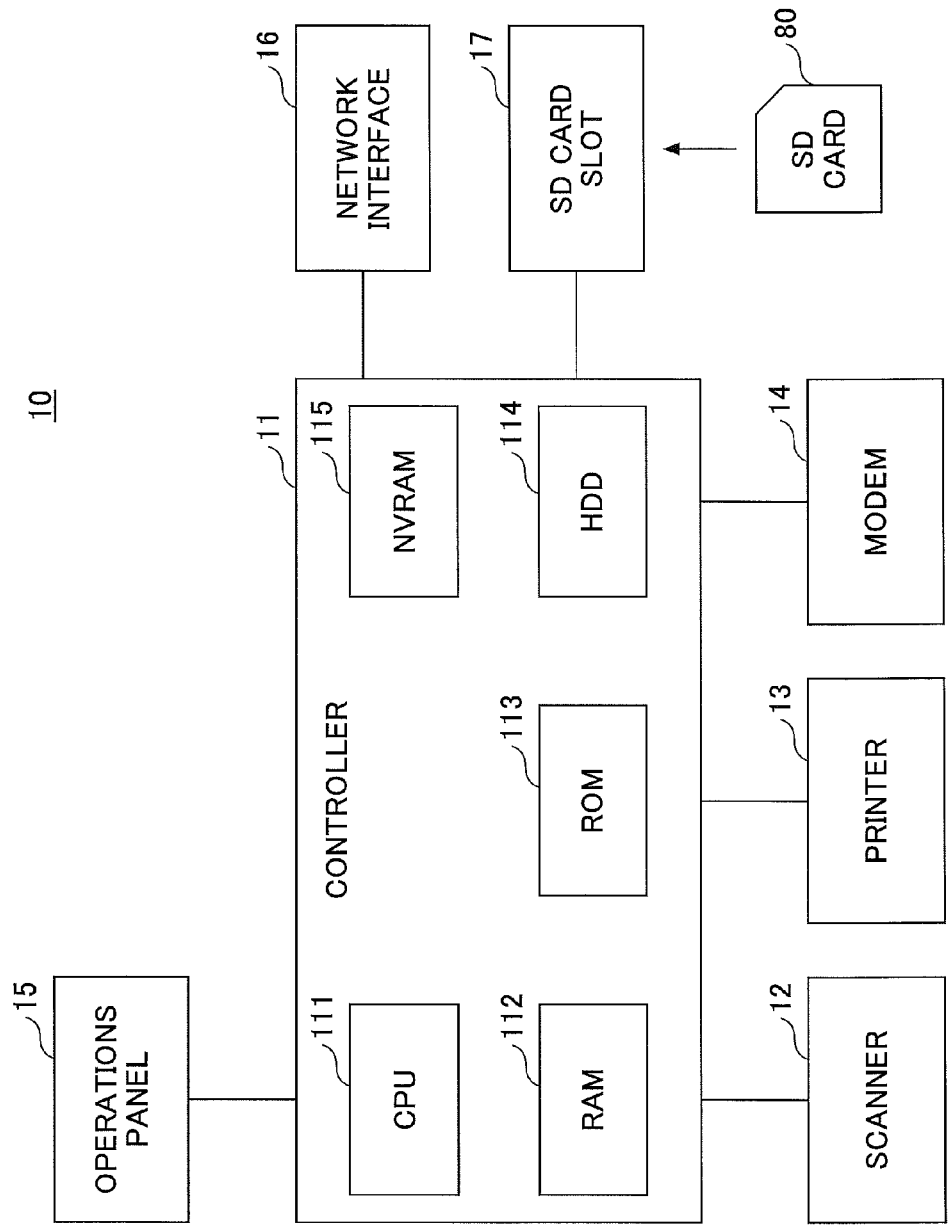
FIG. 2 is a block diagram illustrating an exemplary hardware configuration of an image forming device.

FIG. 2 is a block diagram illustrating an exemplary hardware configuration of the image forming device 10 according to an embodiment. As illustrated in FIG. 2, the image forming device 10 may include, as hardware components, a controller 11, a scanner 12, a printer 13, a modem 14, an operations panel 15, a network interface 16, and a secure digital (SD) card slot 17.

The controller 11 may include a central processing unit (CPU) 111, a random access memory (RAM) 112, a read-only memory (ROM) 113, a hard disk drive (HDD) 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The scanner 12 is a hardware component (image scanning unit) for scanning a document to obtain image data. The printer 13 is a hardware component (printing unit) for printing print data on a recording medium such as paper. The modem 14 is a hardware component for connecting the image forming device 10 to a telephone line and is used to send and receive image data for facsimile communications. The operations panel 15 is a hardware component including an input unit such as buttons for receiving user inputs and a display unit such as a liquid crystal display panel. For example, a liquid crystal display panel including a touch panel function may be used as the display unit. In this case, the liquid display panel may also function as the input unit. The network interface 16 is a hardware component for connecting the image forming device 10 to a (wired or wireless) network such as a local area network (LAN).

The SD card slot 17 reads, for example, programs stored in a secure digital (SD) card 80. With the image forming device 10 configured as described above, in addition to the programs stored in the ROM 113 and the HDD 114, programs stored in the SD card 80 can be loaded into the RAM 112 and executed. Instead of the SD card 80, any other storage medium (e.g., a CD-ROM or a universal serial bus (USB) memory) may also be used for this purpose. That is, a storage medium that can be mounted on the image forming device 10 is not limited to the SD card 80. When a storage medium other than the SD card 80 is used, the SD card slot 17 may be replaced with a hardware component corresponding to the storage medium used.

Figure 3:
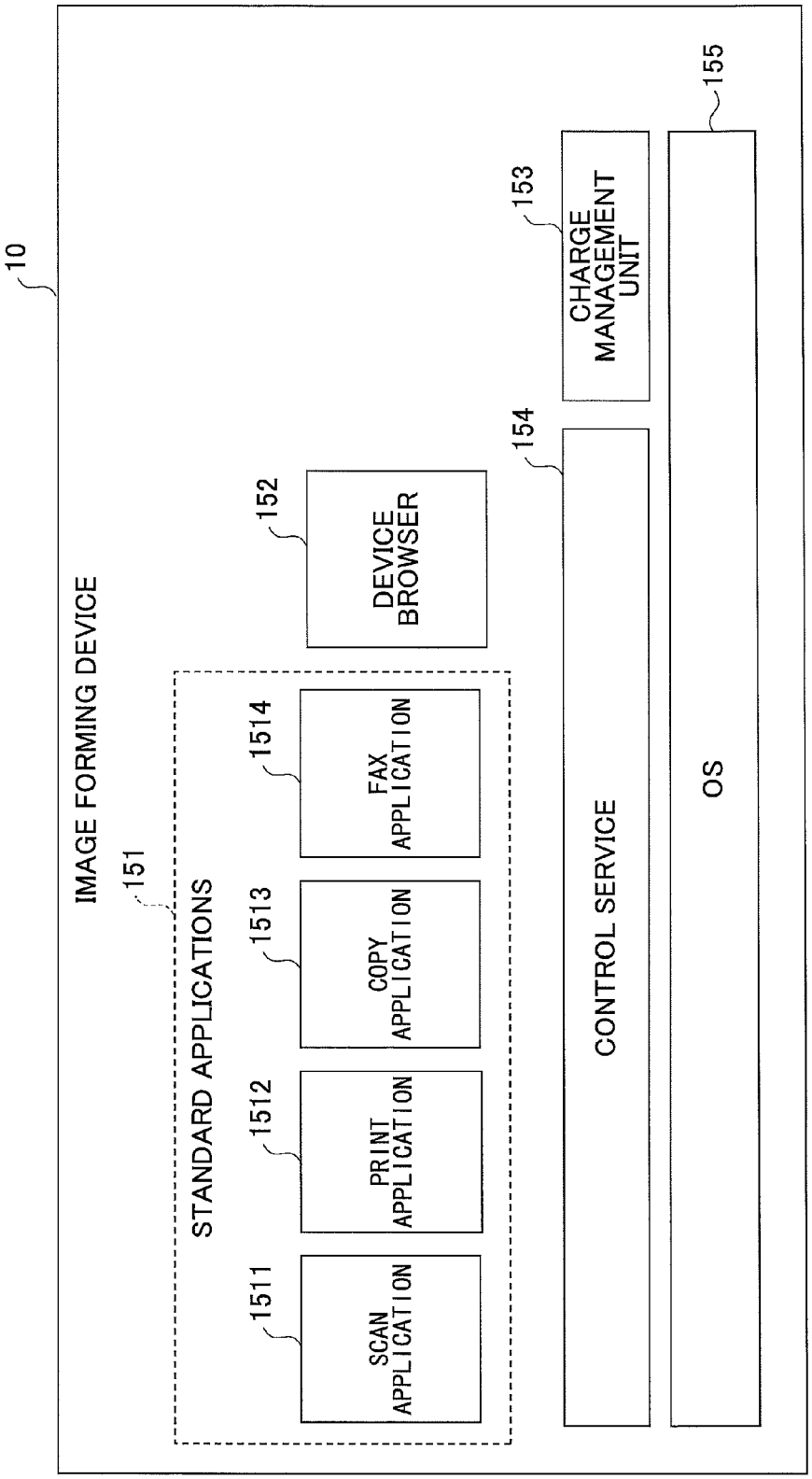
FIG. 3 is a drawing illustrating an exemplary software configuration of an image forming device.

FIG. 3 is a drawing illustrating an exemplary software configuration of the image forming device 10. As illustrated in FIG. 3, the image forming device 10 may include standard applications 151, a device browser 152, a charge management unit 153, a control service 154, and an OS 155.

The standard applications 151 are default applications installed in the image forming device 10 before the factory shipment. In the example of FIG. 3, the standard applications 151 include a scan application 1511, a print application 1512, a copy application 1513, and a fax application 1514. The scan application 1511 performs a scan job. The print application 1512 performs a print job. The copy application 1513 performs a copy job. The fax application 1514 performs a facsimile transmission job and a facsimile reception job.

The control service 154 is implemented by software modules that, for example, provide functions for controlling various hardware resources to upper-layer applications and perform fundamental functions of the image forming device 10.

The device browser 152 is a program that obtains Web pages from the Web server device 20 and displays the obtained Web pages on the operations panel 15. Also, the device browser 152 can parse (or interpret) a script (a program written in a scripting language) in a Web page and cause the image forming device 10 to perform a process according to the script. That is, the device browser 152 can parse extended scripts (e.g., a scan request) for controlling the image forming device 10 in addition to scripts that a general-purpose Web browser can parse. The device browser 152 may be installed, for example, via the SD card 80 or a network into the image forming device 10.

The charge management unit 153 manages charging information and updates the charging information when a given function of the image forming device 10 is used or executed. The charging information may be represented by, for example, charge counts recorded in the NVRAM 115 and indicating the numbers of times that respective functions of the image forming device 10 are executed. The charge counts are increased when the corresponding functions (e.g., copying and scanning) are executed.

The OS 155 is an operating system. Software programs in the image forming device 10 run as processes or threads on the OS 155.

Figure 4:
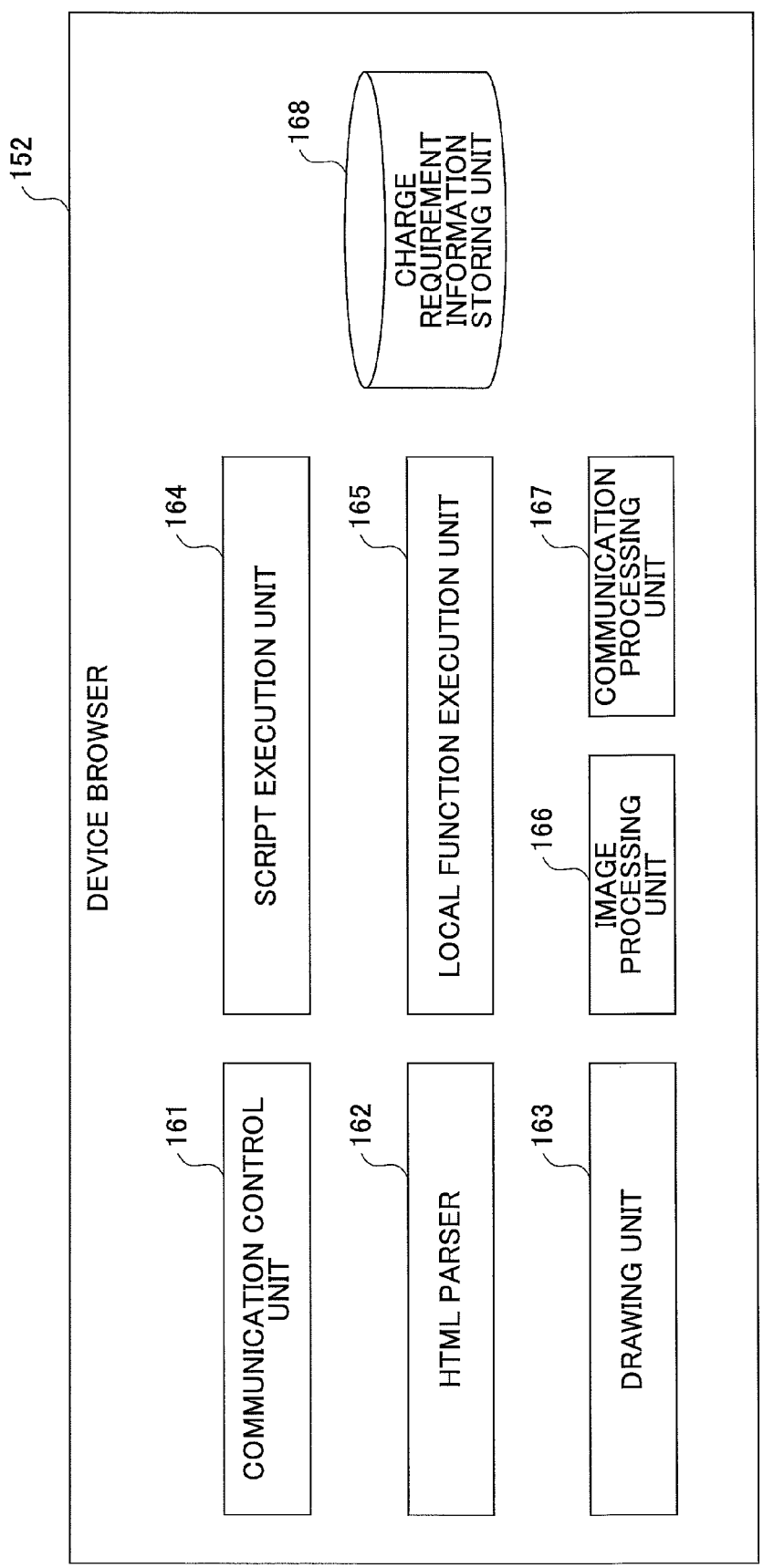
FIG. 4 is a drawing illustrating an exemplary functional configuration of a device browser.

The device browser 152 is described below in more detail. FIG. 4 is a drawing illustrating an exemplary functional configuration of the device browser 152. As illustrated in FIG. 4, the device browser 152 includes a communication control unit 161, an HTML parser 162, a drawing unit 163, a script execution unit 164, a local function execution unit 165, an image processing unit 166, a communication processing unit 167, and a charge requirement information storing unit 168.

The communication control unit 161 controls HTTP communications as a client. For example, the communication control unit 161 sends a request (an HTTP request) to the Web server device 20 and receives a response (an HTTP response) from the Web server device 20.

The HTML parser 162 parses (or interprets) HTML code and scripts (e.g., Javascript (registered trademark)) in a Web page included in a response from the Web server device 20. For example, based on the parsed results, the HTML parser 162 requests the drawing unit 163 to draw a screen defined by the HTML code and/or requests the script execution unit 164 to execute the scripts.

The script execution unit 164 performs a process according to a script written in a Web page. The script execution unit 164 can execute standard scripts such as Javascript (registered trademark) that a general-purpose Web browser can parse as well as scripts (hereafter called extended scripts) that are extended for the image forming device 10. Examples of extended scripts include a print request and a scan request. When an extended script is included in a Web page, the script execution unit 164 requests the local function execution unit 165 to perform a process corresponding to the extended script.

The local function execution unit 165 controls execution of a process corresponding to an extended script in response to a request from the script execution unit 165.

The image processing unit 166 is implemented by, for example, libraries that provide function interfaces for image processing such as copying, scanning, and printing. For example, the local function execution unit 165 uses the image processing unit 166 to cause the image forming device 10 to perform copying, scanning, or printing.

The communication processing unit 167 is implemented by, for example, a library that provides a function interface for network communication processing. For example, the local function execution unit 165 uses the communication processing unit 167 to cause the image forming device 10 to download a document (or document data) to be printed.

The charge requirement information storing unit 168 stores, for each extended script, charge requirement information indicating whether it is necessary to charge for the use of the image forming device 10 resulting from execution of the extended script. In other words, the charge requirement information storing unit 168 stores information indicating scripts that require charges. The charge requirement information storing unit 168 may be implemented, for example, by a storage area of the HDD 114 or the NVRAM 115.

Figure 5:
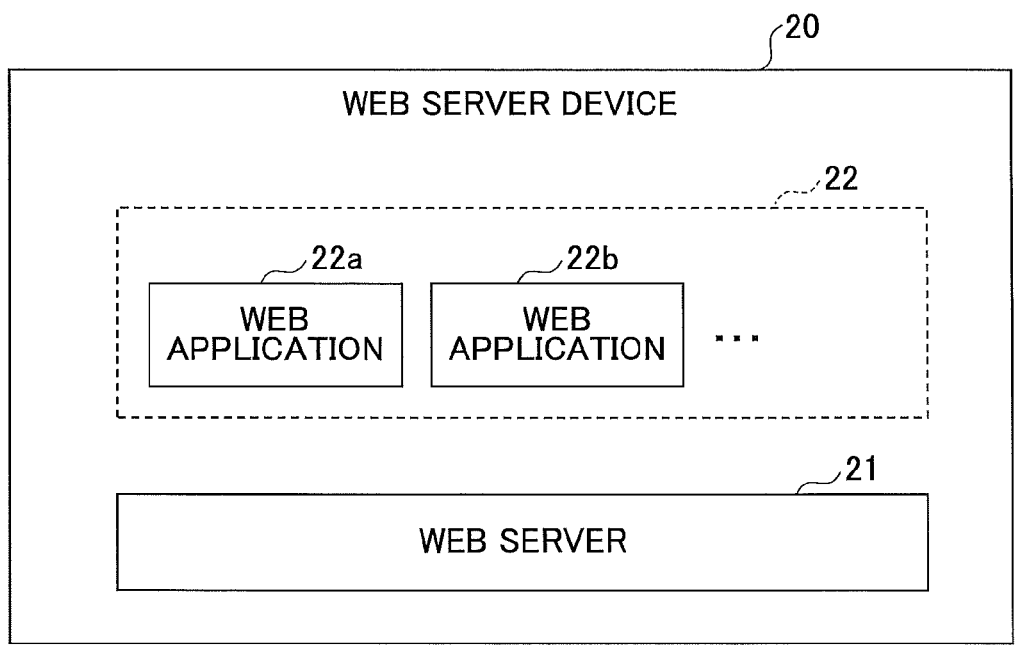
FIG. 5 is a drawing illustrating an exemplary software configuration of a Web server device.

FIG. 5 is a drawing illustrating an exemplary software configuration of the Web server device 20.

As illustrated in FIG. 5, the Web server device includes a Web server 21 and one or more Web applications 22 (22a, 22b).

The Web server 21 controls HTTP communications as a server. For example, the Web server 21 receives a request (an HTTP request) from a client (i.e., the device browser 152) and executes one of the Web applications 22 corresponding to a URL specified in the request. Then, the Web server 21 sends a response including a processing result (e.g., a Web page) of the executed Web application 22 to the client sending the request.

The Web applications 22 are application programs that provide services via the network.

An exemplary process involving the Web application 22a is described below with reference to FIG. 6.

Figure 6:
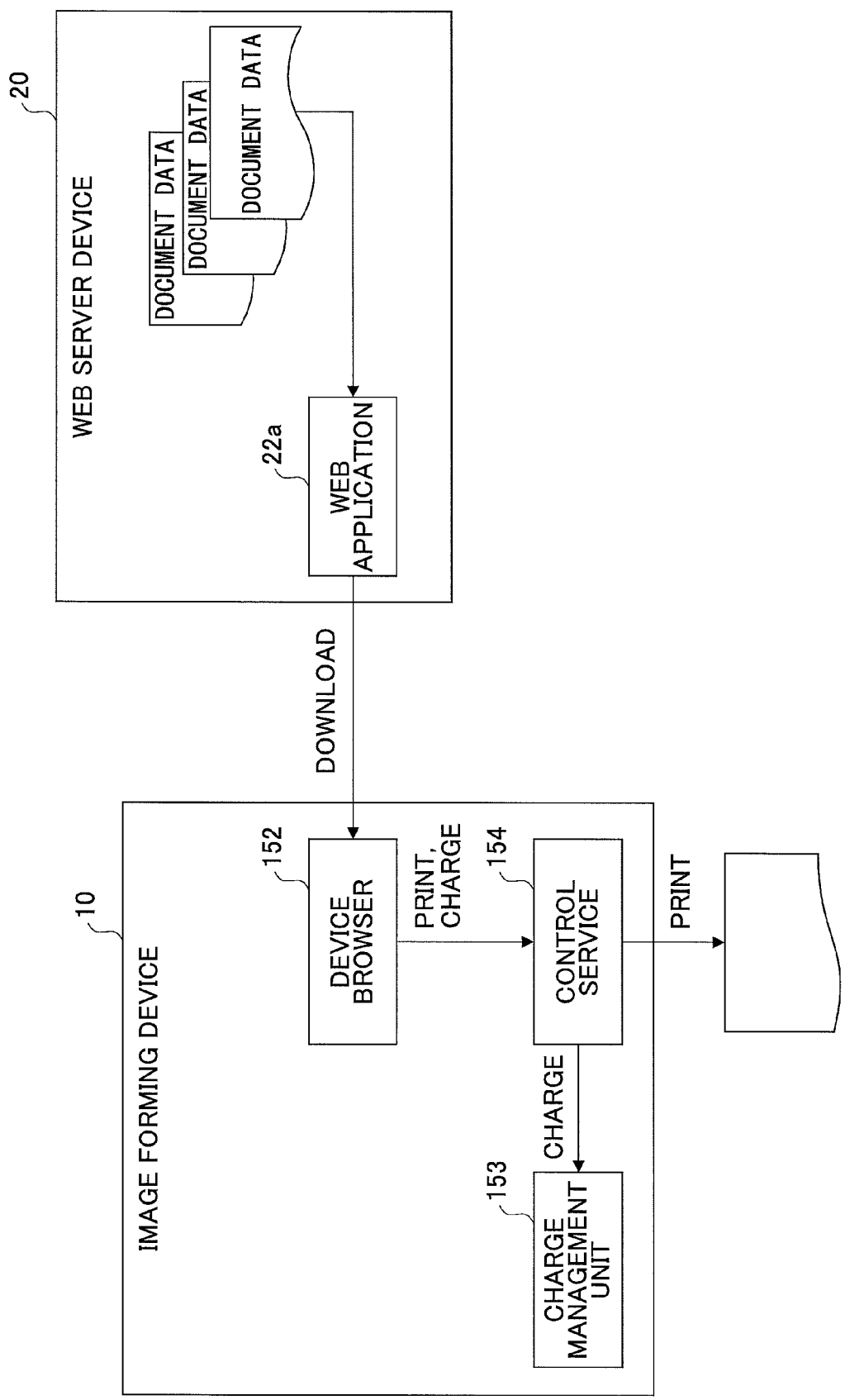
FIG. 6 is a drawing used to describe an exemplary process according to an embodiment.

In FIG. 6, it is assumed that the Web application 22a includes a function to provide documents (or document data) stored in the Web server device 20. The device browser 152 causes the image forming device 10 to download (or obtain) a document from the Web server device 20 according to an extended script written in a Web page generated by the Web application 22a. Then, the device browser 152 requests the control service 154 to print the document downloaded according to the extended script in the Web page. Also, if the extended script is charged for, the device browser 152 reports to the control service 154 that the extended script is charged for. In response, the control service 154 causes the image forming device 10 to print the print data. Also, if the extended script is charged for, the control service 154 requests the charge management unit 153 to update the charging information.

Figure 7:
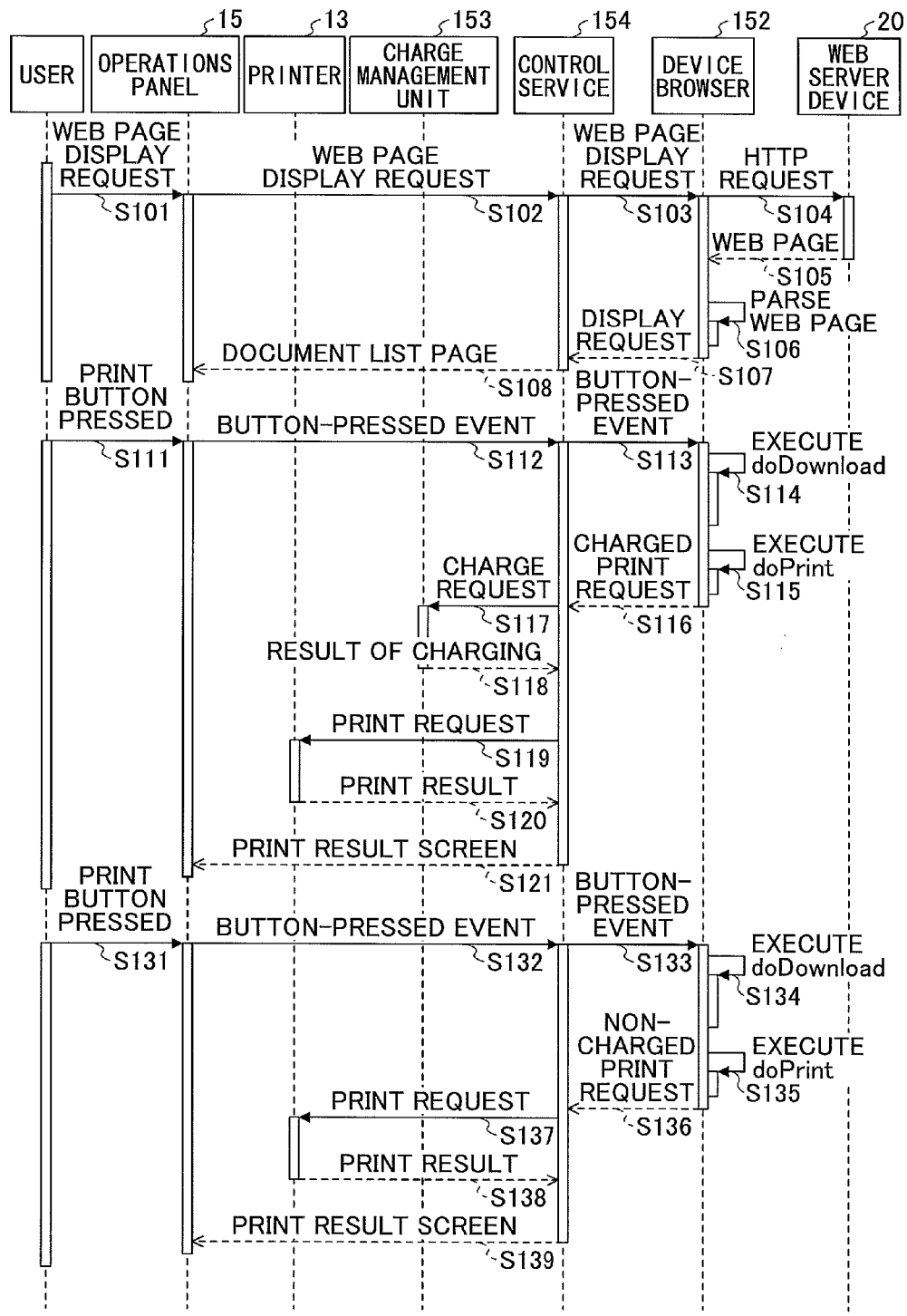
FIG. 7 is a sequence chart illustrating an exemplary process performed by an image forming device.

An exemplary process performed by the image forming device 10 is described below. FIG. 7 is a sequence chart illustrating an exemplary process performed by the image forming device 10.

In step S101, the user enters a request to display a Web page (a Web page display request) via the operations panel 15. The Web page display request is input (or sent) via the control service 154 to the device browser 152 (S102, S103). The Web page display request may be entered, for example, by selecting a screen item (e.g., a button) displayed on the operations panel 15. Here, it is assumed that the screen item is associated with a URL and the URL is specified in the Web page display request.

When receiving the Web page display request, the device browser 152 sends an HTTP request to the URL specified in the Web page display request (S104). In this exemplary process, the URL indicates the Web application 22a of the Web server device 20 and therefore the HTTP request is received by the Web server 21 of the Web server device 20. In response, the Web server 21 starts the Web application 22a corresponding to the URL specified in the HTTP request.

When started, the Web application 22a obtains information indicating a list of documents (or sets of document data) stored in the Web server device 20 and generates a Web page (hereafter called a document list page) including the list of documents. Then, the Web server 21 sends an HTTP response including the generated document list page to the device browser 152.

When receiving the document list page, the device browser 152 parses statements (code, tags, scripts, etc.) in the document list page.

Figure 8:
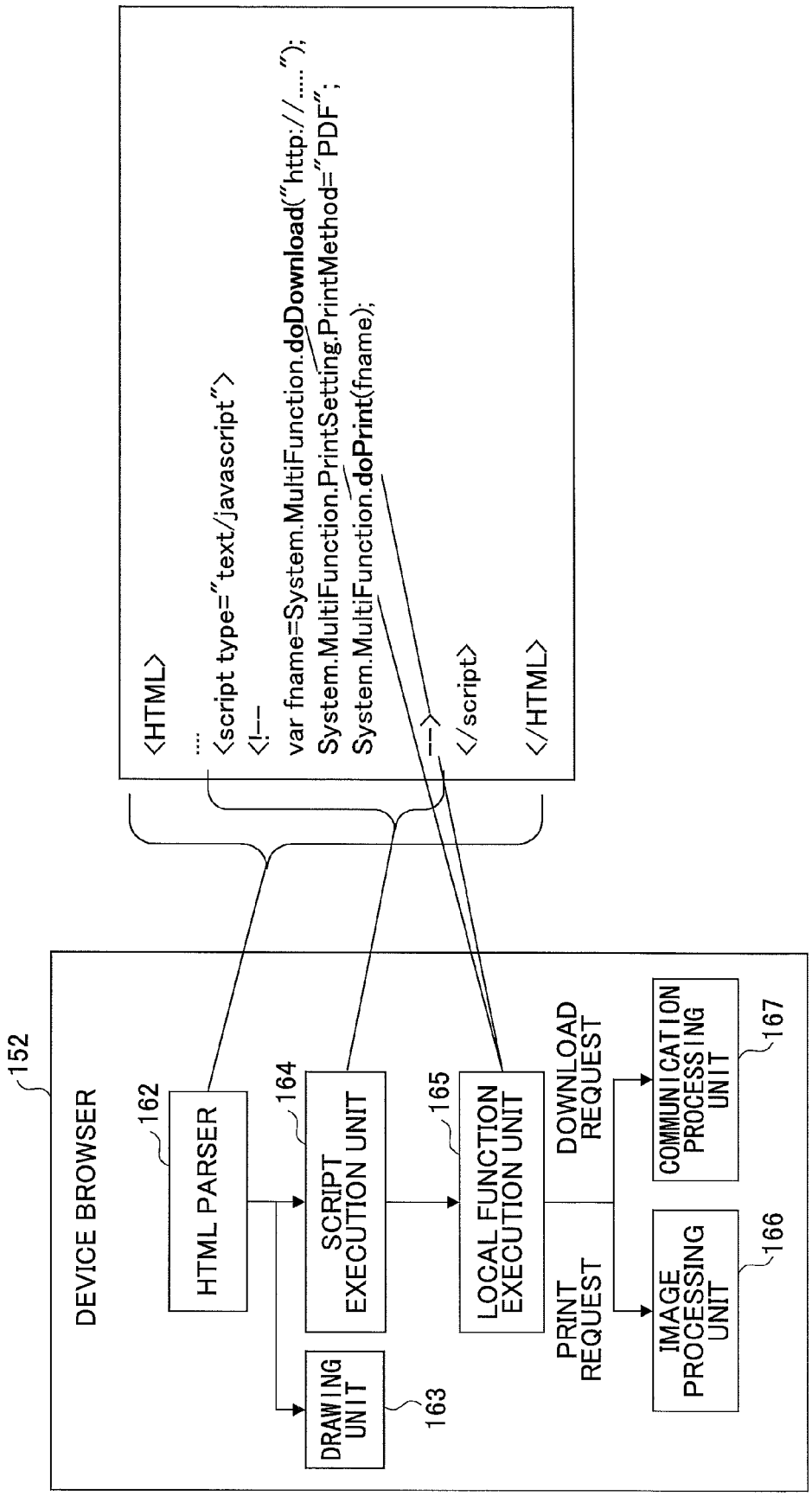
FIG. 8 is a drawing used to describe how a device browser parses statements in a document list page.

FIG. 8 is a drawing used to describe how the device browser 152 parses the statements in the document list page.

The HTML parser 162 parses all the statements in the document list page. According to statements related to drawing (or displaying) in the document list page, the HTML parser 162 requests the drawing unit 163 to draw a screen. Also, according to statements related to scripts in the document list page, the HTML parser 162 requests the script execution unit 164 to execute the scripts. The script execution unit 164 controls execution of standard scripts in the scripts by itself. Meanwhile, the script execution unit 164 requests the local function execution unit 165 to perform processes corresponding to extended scripts (in the example of FIG. 8, "doDownload" and "doPrint") in the scripts. The local function execution unit 165 causes the communication processing unit 167 to perform a process corresponding to the extended script "doDownload" (download request). Also, the local function execution unit 165 causes the image processing unit 166 to perform a process corresponding to the extended script "doPrint" (print request).

In this exemplary process, a drawing process is performed in synchronization with the reception of the document list page. According to the statements related to drawing in the document list page, the drawing unit 163 of the device browser 152 generates image information that the control service 154 can interpret and requests the control service 154 to display the image information (S107). Based on the image information, the control service 154 displays the document list page on the operations panel 15 (S108).

Figure 9:
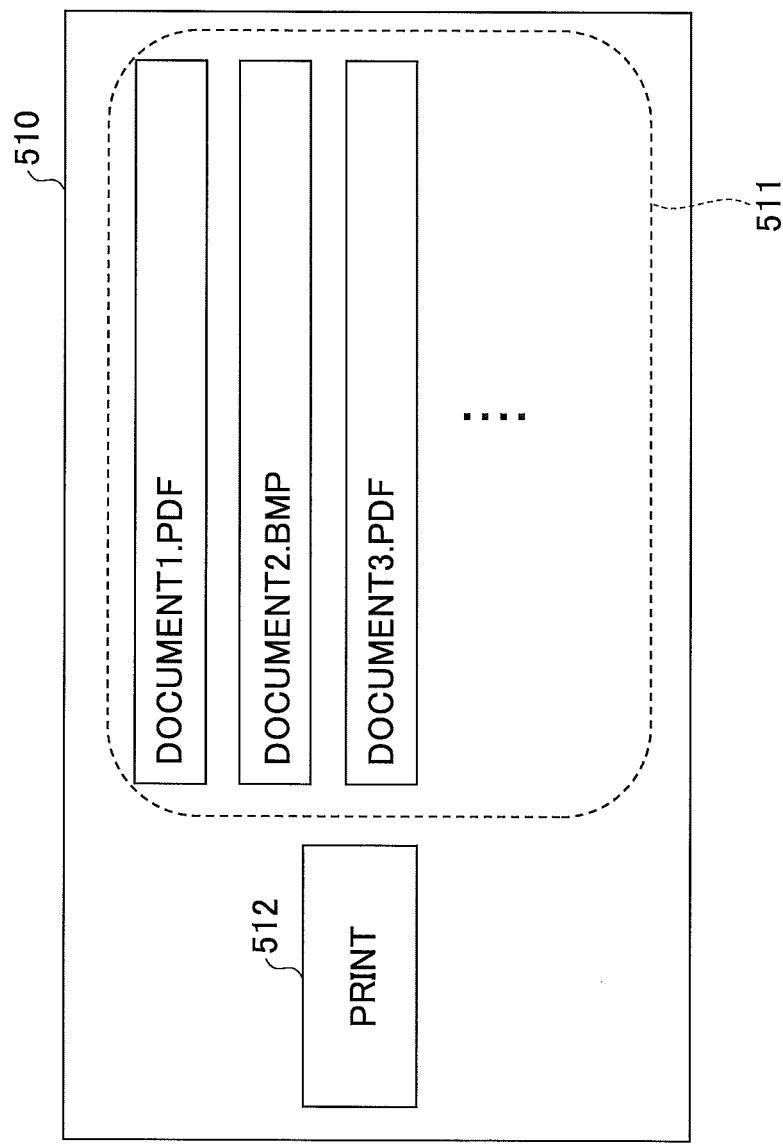
FIG. 9 is a drawing illustrating an exemplary document list page displayed.

FIG. 9 is a drawing illustrating an exemplary document list page 510 displayed. In FIG. 9, the document list page 510 includes a document list display area 511 and a print button 512. The document list display area 511 displays the list of documents. The print button 512 receives a print request for a document selected in the document list display area 511. The document list page 510 may also include an area (or a field) for setting attribute information (e.g., the number of copies, N-up processing, single/double-sided printing, and color modes) for a print job.

When one of the documents is selected on the document list page 510 and the print button 512 is pressed (or touched) (S111), an event (a button-pressed event) indicating that the print button 512 has been pressed is sent via the operations panel 15 and the control service 154 to the device browser 152 (S112, S113). When receiving the button-pressed event, the script execution unit 164 of the device browser 152 executes scripts associated with the button-press event in the document list page 510. More specifically, the script execution unit 164 requests the local function execution unit 165 to perform a process corresponding to the extended script "doDownload" based on the identifier (hereafter called a document ID) of the document selected on the document list page 510.

When requested, the local function execution unit 165 refers to the charge requirement information storing unit 168 to determine whether the extended script "doDownload" is charged for.

FIG. 10 is a table illustrating exemplary information stored in the charge requirement information storing unit 168. As illustrated in FIG. 10, the charge requirement information storing unit 168 stores charge requirement information (may also be called a charge requirement) indicating whether a charge is required, for each extended script and for each combination of an extended script and attribute information of a job (a job attribute) related to the extended script. In the example of FIG. 10, no charge is required for the extended script "doDownload" regardless of the job attribute (e.g., regardless of the object to be downloaded or regardless of from where the object is to be downloaded). Accordingly, the local function execution unit 165 determines that no charge is required for the extended script "doDownload". The local function execution unit 165 downloads the document corresponding to the document ID via the communication processing unit 167 and the control service 154 without performing a process for charging (i.e., without updating the charging information) (S114).

Next, the script execution unit 164 requests the local function execution unit 165 to perform a process corresponding to the extended script "doPrint" for the downloaded document (S115). When requested, the local function execution unit 165 refers to the charge requirement information storing unit 168 to determine whether the extended script "doPrint" is charged for. In the example of FIG. 10, the charge requirement for the extended script "doPrint" differs depending on job attributes. For example, when the data format of the document is the Portable Document Format (PDF) (documentType=pdf), a charge is required. Meanwhile, when the data format of the document is bitmap (documentType=bmp), no charge is required. Also, when the number of pages is one (page=1), no charge is required.

Accordingly, the local function execution unit 165 determines whether a charge is required by referring to the charge requirement information storing unit 168 based on job attribute information (i.e., attribute information of the document to be printed). In this exemplary process, it is assumed that the local function execution unit 165 determines that execution of the extended script "doPrint" for the downloaded document requires a charge.

Here, there may be a case where a document matches a job attribute that does not require a charge, and also matches a job attribute that requires a charge (e.g., one page of a PDF document). To deal with such a case, priorities between different conditions (i.e., "charge required" and "charge not required") may be predetermined.

Attributes other than the data formats and the number of pages of documents may also be used to determine the charge requirement. Further, a print job attribute such as N-up processing (e.g., two pages on one sheet), which is not an attribute of a document itself, may also be used to determine the charge requirement.

When it is determined that execution of the extended script "doPrint" for the downloaded document requires a charge, the local function execution unit 165 sends a print request (charged print request) including information indicating that the print request needs to be charged, via the image processing unit 166 to the control service 154 (S116). When receiving the charged print request, the control service 154 requests the charge management unit 153 to update charging information (i.e., to increase a charge count) for a print job corresponding to the extended script "doPrint" (S117). The charge management unit 153 updates the charging information and sends the result of updating the charging information (e.g., information indicating whether the charging information has been successfully updated) (S118).

When the charging information has been successfully updated, the control service 154 causes the printer 13 to print the downloaded document (or to perform the print job) (S119). When a print result (indicating whether the document is successfully printed) is received from the printer 13 (S120), the control service 154, for example, displays a pop-up screen indicating the print result over the document list page 510 on the operations panel 15 (S121).

Step S131 and subsequent steps represent a process that is performed when a document requiring no charge (in FIG. 10, for example, bitmap data) is selected on the document list page 510 and the print button 512 is pressed.

Steps S131 through S135 are substantially the same as steps S111 through S115, except that the local function execution unit 165 determines, in step S135, that execution of the extended script "doPrint" for the downloaded document (here, bitmap data) requires no charge. Then, the local function execution unit 165 sends a print request (non-charged print request) including information indicating that the print request does not need to be charged, via the image processing unit 166 to the control service 154 (S136).

When receiving the non-charged print request, the control service 154 causes the printer 13 to print the downloaded document without requesting the charge management unit 153 to update the charging information (S137). Steps S138 and S139 are substantially the same as steps S120 and S121.

As described above, the above embodiment makes it possible to determine the charge requirement (i.e., whether a charge is required) for each script and for each combination of a script and attribute information of a process (or a job) performed according to the script. In other words, the above embodiment makes it possible to flexibly charge for processes that are performed according to potentially differing scripts.

The above embodiment may also be applied to jobs (processes or functions) other than scanning, copying, facsimile transmission, and printing.

In the above embodiment, the image forming device 10 and the Web server device 20 are provided separately. Alternatively, the image forming device 10 may include the Web server 21 and the Web applications 22.

An aspect of this disclosure provides a device, a system, a charging method, and a non-transitory computer-readable storage medium storing program code that make it possible to flexibly charge for processes that are performed according to definitions of a Web page.

The present invention is not limited to the specifically disclosed embodiments, and variations and modifications may be made without departing from the scope of the present invention.

What is claimed is:

1. A device, comprising:
a display control unit configured to display a Web page on an operations panel, the Web page including a script for controlling the device;
an execution unit configured to cause the device to perform a process according to an instruction indicated by the script; and
a storing unit configured to store information indicating whether respective instructions indicated by scripts require charges,
wherein the execution unit is configured to
determine whether the instruction indicated by the script included in the Web page requires a charge by referring to the information stored in the storing unit, and
update charging information for the process performed according to the instruction indicated by the script when the instruction requires the charge.

2. The device as claimed in claim 1, wherein
the storing unit is configured to store the information in association with attribute information of processes corresponding to the instructions indicated by the scripts; and
the execution unit is configured to determine whether the instruction indicated by the script requires the charge by referring to the information stored in the storing unit based on attribute information of the process.

3. The device as claimed in claim 2, wherein
the process performed according to the instruction indicated by the script is a print job; and
the execution unit is configured to determine whether the instruction requires the charge by referring to the information stored in the storing unit based on the attribute information of the print job.

4. A method performed by a processor of a device, the method comprising:
displaying a Web page on an operations panel, the Web page including a script for controlling the device;
causing the device to perform a process according to an instruction indicated by the script;
determining whether the instruction indicated by the script included in the Web page requires a charge by referring to information that is stored in a storing unit and indicates whether respective instructions indicated by scripts require charges; and
updating charging information for the process performed according to the instruction indicated by the script when the instruction requires the charge.

5. The method as claimed in claim 4, wherein
the information is stored in the storing unit in association with attribute information of processes corresponding to the instructions indicated by the scripts; and
whether the instruction indicated by the script requires the charge is determined by referring to the information stored in the storing unit based on attribute information of the process.

6. The method as claimed in claim 5, wherein
the process performed according to the instruction indicated by the script is a print job; and
whether the instruction requires the charge is determined by referring to the information stored in the storing unit based on the attribute information of the print job.

7. A system, comprising:
a device; and
an information processing apparatus configured to send a Web page to the device;
wherein the device includes
a display control unit configured to display the Web page on an operations panel, the Web page including a script for controlling the device;
an execution unit configured to cause the device to perform a process according to an instruction indicated by the script; and
a storing unit configured to store information indicating whether respective instructions indicated by scripts require charges,
wherein the execution unit is configured to
determine whether the instruction indicated by the script included in the Web page requires a charge by referring to the information stored in the storing unit, and
update charging information for the process performed according to the instruction indicated by the script when the instruction requires the charge.

8. The system as claimed in claim 7, wherein
the storing unit is configured to store the information in association with attribute information of processes corresponding to the instructions indicated by the scripts; and
the execution unit is configured to determine whether the instruction indicated by the script requires the charge by referring to the information stored in the storing unit based on attribute information of the process.

9. The system as claimed in claim 8, wherein
the process performed according to the instruction indicated by script is a print job; and
the execution unit is configured to determine whether the instruction requires the charge by referring to the information stored in the storing unit based on the attribute information of the print job.

* * * * *